(12) United States Patent
Hall et al.

(10) Patent No.: US 10,046,962 B2
(45) Date of Patent: Aug. 14, 2018

(54) MOBILE VEHICLE REFUELING SYSTEM

(71) Applicants: David R. Hall, Provo, UT (US); Stephen Hall, Draper, UT (US); Haley Lott, Provo, UT (US); Eric Magleby, Provo, UT (US); Joe Fox, Spanish Fork, UT (US)

(72) Inventors: David R. Hall, Provo, UT (US); Stephen Hall, Draper, UT (US); Haley Lott, Provo, UT (US); Eric Magleby, Provo, UT (US); Joe Fox, Spanish Fork, UT (US)

(73) Assignee: Hall Labs LLC, Provo, UT (US)

( * ) Notice: Subject to any disclaimer, the term of this patent is extended or adjusted under 35 U.S.C. 154(b) by 82 days.

(21) Appl. No.: 15/188,186

(22) Filed: Jun. 21, 2016

(65) Prior Publication Data
US 2017/0362076 A1 Dec. 21, 2017

(51) Int. Cl.
| | |
|---|---|
| *B67D 7/22* | (2010.01) |
| *H04W 4/04* | (2009.01) |
| *H04W 4/02* | (2018.01) |
| *B67D 7/84* | (2010.01) |
| *B67D 7/04* | (2010.01) |
| *B67D 7/42* | (2010.01) |
| *B60S 5/02* | (2006.01) |
| *B60L 11/18* | (2006.01) |
| *H04W 4/029* | (2018.01) |

(52) U.S. Cl.
CPC .............. *B67D 7/22* (2013.01); *B60L 11/1824* (2013.01); *B60S 5/02* (2013.01); *B67D 7/04* (2013.01); *B67D 7/42* (2013.01); *B67D 7/845* (2013.01); *H04W 4/028* (2013.01); *H04W 4/029* (2018.02); *H04W 4/046* (2013.01)

(58) Field of Classification Search
CPC .......... B60L 11/1824; B60S 5/02; B67D 7/04; B67D 7/22; B67D 7/42; B67D 7/845; H04W 4/028; H04W 4/046
USPC ........................................................... 141/2
See application file for complete search history.

(56) References Cited

U.S. PATENT DOCUMENTS

| | | | | |
|---|---|---|---|---|
| 5,913,180 | A * | 6/1999 | Ryan ...................... | B67D 7/145 235/375 |
| 6,237,647 | B1 * | 5/2001 | Pong .................... | B67D 7/0401 141/231 |
| 6,374,870 | B1 * | 4/2002 | Muller ................... | B67D 7/067 141/198 |
| 7,619,319 | B1 * | 11/2009 | Hunter ................ | B60L 11/1816 290/4 R |
| 2012/0303397 | A1 * | 11/2012 | Prosser ................. | H02J 7/0054 705/7.12 |

(Continued)

*Primary Examiner* — Timothy L Maust
*Assistant Examiner* — Andrew Schmid

(57) ABSTRACT

A system whereby a mobile fuel station may refuel vehicles is disclosed. Fuel reservoirs are provided in a mobile fuel station that may store fuel and dispense fuel through a hybrid fuel line. Fuel nozzles are provided which can be detachably connected to the hybrid fuel line and can measure and display fuel dispensed from the mobile fuel station. Communication devices and a network are provided that allow a vehicle and a mobile fuel station to communicate location and status information wirelessly with the network. Refueling services and maintenance services that may be carried out using the mobile fuel station are also disclosed and claimed herein.

20 Claims, 19 Drawing Sheets

(56) References Cited

U.S. PATENT DOCUMENTS

2013/0240080 A1\* 9/2013 Pick .................. B67D 7/04
 141/4
2014/0311619 A1\* 10/2014 Herp ................ B67D 7/426
 141/1

\* cited by examiner

MOBILE VEHICLE REFUELING SYSTEM

BACKGROUND

Field of the Invention

This invention relates to systems for refueling a vehicle using a mobile fuel station.

Background of the Invention

The majority of vehicles (land, sea, and air) consume a combustible form of fuel in order to operate. Almost all of the remaining vehicles instead run on electricity and rely on some type of battery to operate. In either case, almost all vehicles require some form of refueling involving either the refilling of a fuel tank with a combustible fuel or the recharging of a battery bank. Refueling generally takes place at stationary locations such as gas stations and charging stations. Mobile refueling stations or services are comparatively limited for the average vehicle owner and user. The result is an immense waste of collective time and fuel as many vehicle users feel compelled to drive out of routine routes or use additional time to travel to a stationary refueling location. In the case of gasoline engine based vehicles, the waste is exacerbated by varying fuel prices that may cause a vehicle user to travel even further for a cheaper fuel price. Thus, there is a need for a more fuel-efficient system whereby the waste produced by refueling procedures is reduced while maintaining convenience for the vehicle user.

Many refueling stations are open at all hours of the day and are designed for convenience and user-friendliness. Nevertheless, there is opportunity to increase convenience and user-friendliness of the vehicle refueling process, which includes paying for the refueling service. Additionally, should the need for a user to manually refuel the vehicle be removed completely, the user-friendliness of the vehicle itself is also substantially increased. Thus, a refueling system that increases refueling convenience and user-friendliness may benefit the refueling service provider, the vehicle user, and the vehicle manufacturer.

Autonomous vehicles and driver-less vehicles also present a unique opportunity for increased driving efficiency and convenience. Thus far autonomous vehicle development has been focused on increasing efficiency in vehicles used to transport materials in mines, goods in warehouses, and passengers in a variety of contexts. With the advance of autonomous vehicle technologies which are connected to a network, there is a need in the art for an autonomous vehicle system in which the fueling station is not stationary.

In view of the foregoing, improved systems and methods to refuel vehicles using a mobile refueling system are needed. Ideally, such systems and methods will eliminate and/or reduce the need for a vehicle user to manually refuel their vehicle. Such systems and methods will also ideally increase general fuel efficiency by reducing wasted fuel consumed by vehicle users in the pursuit of a refueling station service.

SUMMARY

This invention has been developed in response to the present state of the art and, in particular, in response to the problems and needs in the art that have not yet been fully solved by currently available systems and methods. Accordingly, improved systems have been developed to refuel vehicles using a mobile fuel station. Features and advantages of different embodiments of the invention will become more fully apparent from the following description and appended claims, or may be learned by practice of the invention as set forth hereinafter.

Consistent with the foregoing, a mobile refueling system is disclosed. Means of communication between a vehicle requiring refueling and a mobile fuel station are disclosed. Autonomous systems which can communicate a vehicle's need for refueling or maintenance services are disclosed. A mobile fuel station utilizing separate fuel reservoirs and dispensing fuel through a hybrid fuel line are disclosed. Fuel nozzles are disclosed which can be detachably connected to the hybrid fuel line to dispense fuel from the mobile fuel station. Data analyses used by a network to optimize mobile fuel station services are disclosed. Means by which a user can indicate service preferences or request services are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Figure 1:
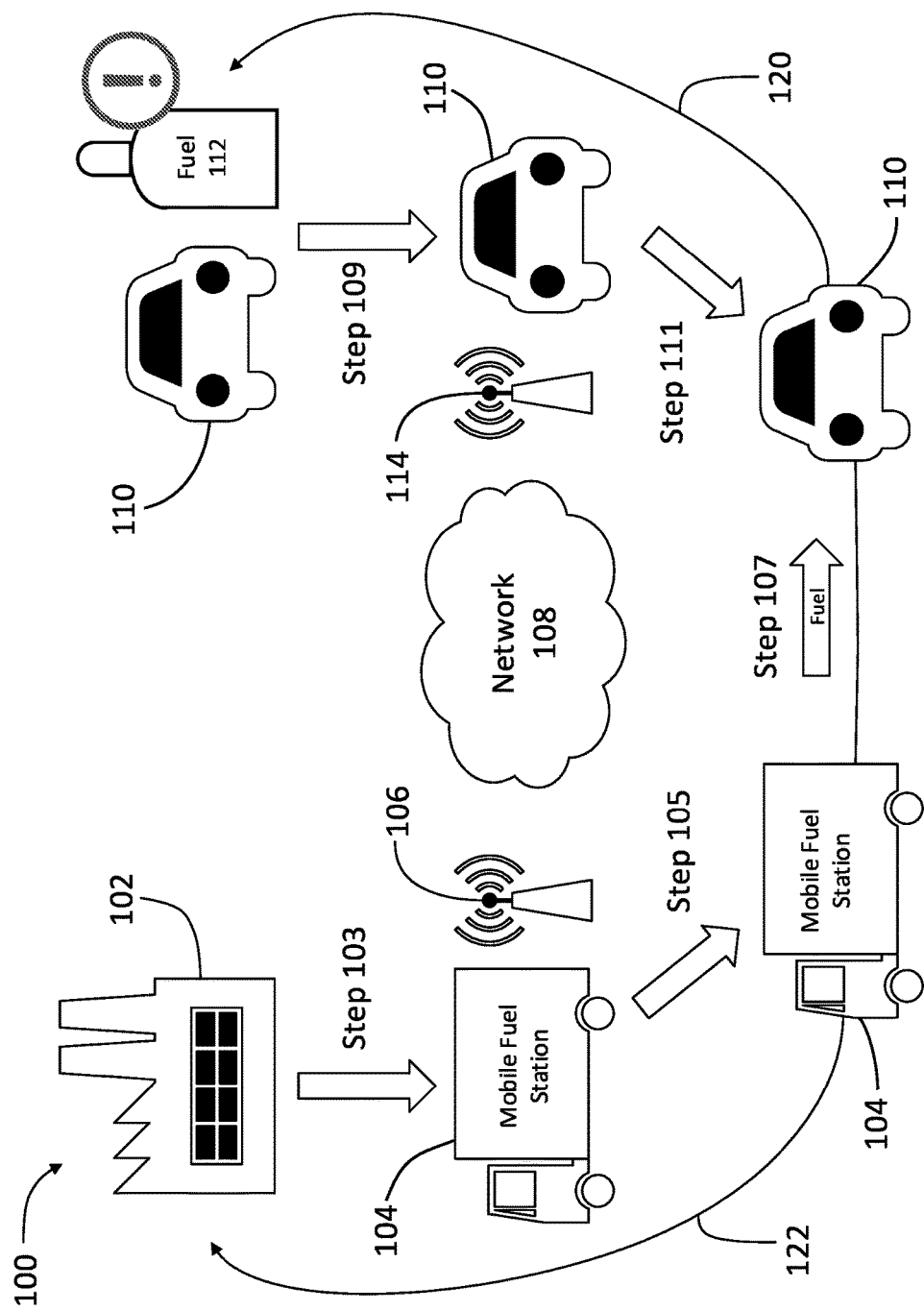
FIG. 1 is a system diagram of a mobile vehicle refueling system.

FIG. 1 shows a system diagram detailing components of one embodiment of a mobile refueling system 100 and the steps in a corresponding method of refueling a vehicle. A fuel plant 102 is shown. The fuel plant 102 may be a facility capable of supplying and servicing one or more mobile fuel stations 104 and may be dedicated solely to the operation of a mobile refueling system or may be just partially dedicated to the operation of a mobile refueling system. The fuel plant 102 may be a stationary refueling facility such as are currently commonplace throughout the world with additional support for a mobile fuel station. The fuel plant 102 performs step 103 wherein the mobile fuel station 104, is serviced and supplied with additional fuel, fuel modules, fluids, components, or materials used for refueling and maintenance services as detailed hereafter. The mobile fuel station 104 uses a second communication device 106 to communicate with a network 108. The second communication device 106 may comprise a wireless internet system, a Sure-Fi system, or other electromagnetic communication device. The network 108 may be a cloud-based server wherein data is stored remotely. The network 108 may also be a remote computer which serves not only as a data storage device, but also as a data processor and analyzer. The mobile fuel station 104 receives commands and data through the second communication device 106 from the network 108. The mobile fuel station 104 performs step 105 which comprises traveling to a location specified by the network 108, the location corresponding to the location of a vehicle 110. The mobile fuel station 104, upon arrival to a specified vehicle location, performs step 107, which comprises a refueling service to the vehicle 110. Upon completion of step 107, the mobile fuel station 104 may perform step 105 by traveling to a new vehicle location specified by the network 108 through the second communication device 106, or the mobile fuel station 104 may make a return trip 122 to the fuel plant 102 in order to resupply itself or receive servicing. The mobile fuel station 104 may be operated at least partially by a human operator or at least partially by an autonomous system preprogrammed to carry out steps 103, 105, 107. The vehicle 110 may consume fuel 120 until a fuel level indicator 112 indicates that the vehicle requires refueling. The fuel level indicator 112 may use a pressure transducer, float, ultrasonic sensor, or other sensor to determine whether the fuel level in the vehicle 110 has reached a predetermined range of levels indicating that the vehicle 110 requires refueling. The fuel level indicator 112, may indicate a charge level on a battery for an electric vehicle, and may indicate that the voltage of a battery has reached a predetermined range of voltages indicating that the vehicle 110 requires refueling. The fuel level indicator 112 may indicate that the pressure of a fuel tank has reached a predetermined range of pressures indicating that the vehicle 110 requires refueling in the case that the vehicle uses compressed natural gas. The fuel level indicator 112 may also comprise a mechanical or digital display button which allows a vehicle user to indicate that the vehicle 110 requires refueling even though the fuel level has not reached a predetermined range of levels. A user might choose to engage such a feature before a long trip, or prior to returning the vehicle 110 to a primary owner. Upon triggering of the fuel level indicator 112, the vehicle performs step 109, wherein a vehicle travels to a destination and is parked while the vehicle operator and passengers are away. Step 109 may occur, for example, when a vehicle operator drives himself or herself or is driven by an autonomous system to a place of employment, whereupon the vehicle 110 is parked and the vehicle operator exits the vehicle. Step 109 may also occur when a vehicle operator drives himself or herself or is driven by an autonomous system to a place or residence, whereupon the vehicle 110 is parked and the vehicle operator exits the vehicle. The vehicle 110 communicates vehicle status and location data with the network 108 by means of a first communication device 114. The vehicle then performs step 111, wherein the vehicle 110 continues to wirelessly communicate its status and location until the vehicle 110 is refueled by step 107.

Figure 2:
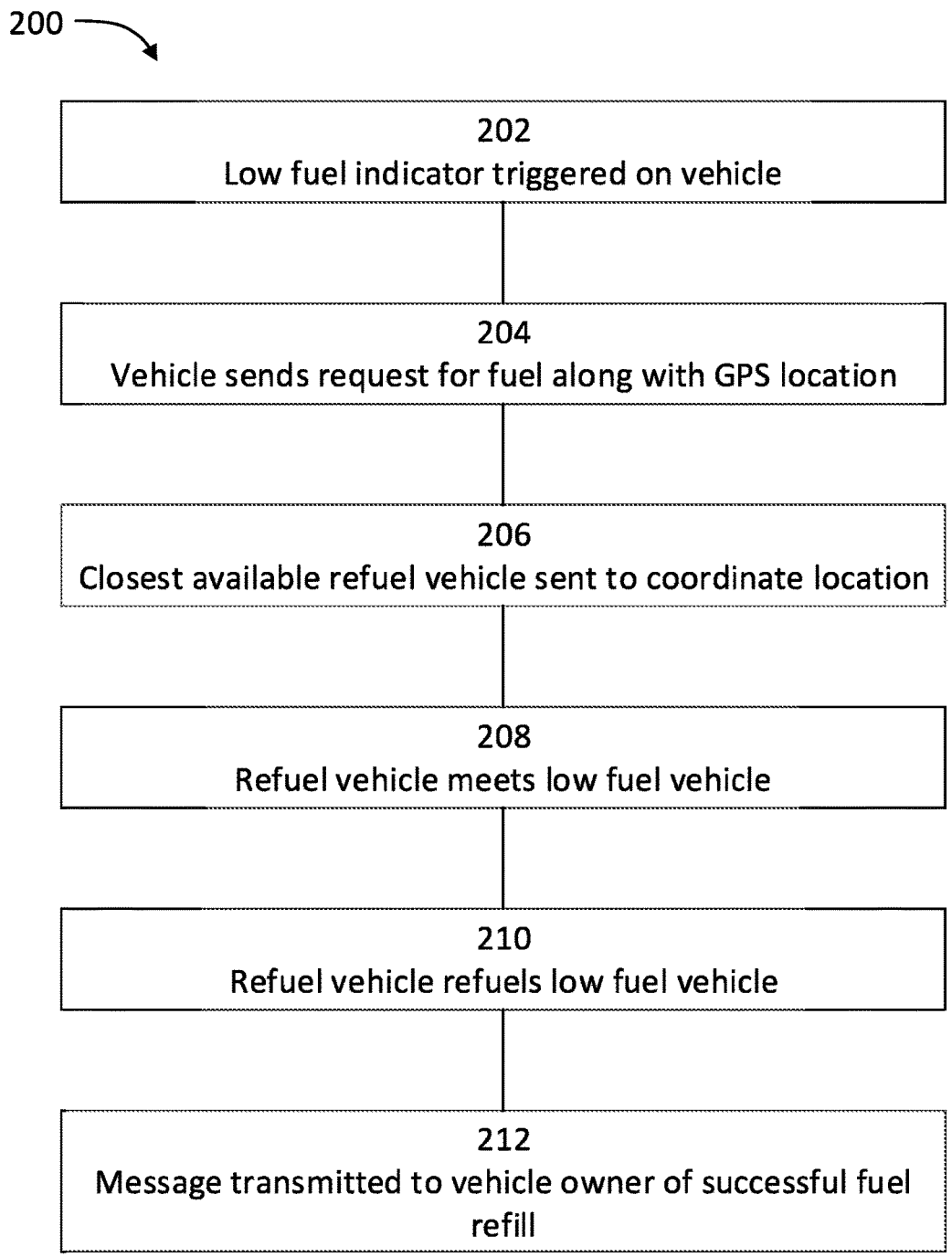
FIG. 2 is a block diagram of steps used in a mobile vehicle refueling system.

FIG. 2 shows a block diagram 200 of the steps taken in one embodiment of the present invention. A vehicle will maintain regular operation until state 202 is reached. The state 202 is entered when a sensor on the vehicle indicates that the fuel level in the vehicle has reached a sufficiently low level to require refueling or a vehicle user has engaged a feature indicating that they desire the vehicle to be refueled. Upon reaching state 202, the vehicle performs step 204 wherein the vehicle uses a wireless communication device to send to a network a request for fuel along with GPS location of the vehicle. The network then performs step 206 wherein the network determines which mobile fuel station (in this case a refuel vehicle) is closest to the GPS location received and sends a command for the mobile fuel station that is closest to travel to the GPS location received. The mobile fuel station then performs step 208 wherein the mobile fuel station travels to the vehicle and meets the vehicle. The mobile fuel station then performs step 210 wherein the mobile fuel station refuels the vehicle. Step 210 may comprise pumping combustible fuel in liquid or gas form into the vehicle fuel tank. The fuel may be gasoline, diesel, ethanol, natural gas, compressed natural gas, hydrogen, propane, biodiesel, methanol, P-series fuels, and/or propane. Alternatively, step 210 may comprise charging a battery in an electrical vehicle, or replacement of a fuel module, where the fuel module is a replaceable portion of a battery bank or a replaceable portion of a fuel tank and is shown described hereafter in FIG. 10.

Figure 3:
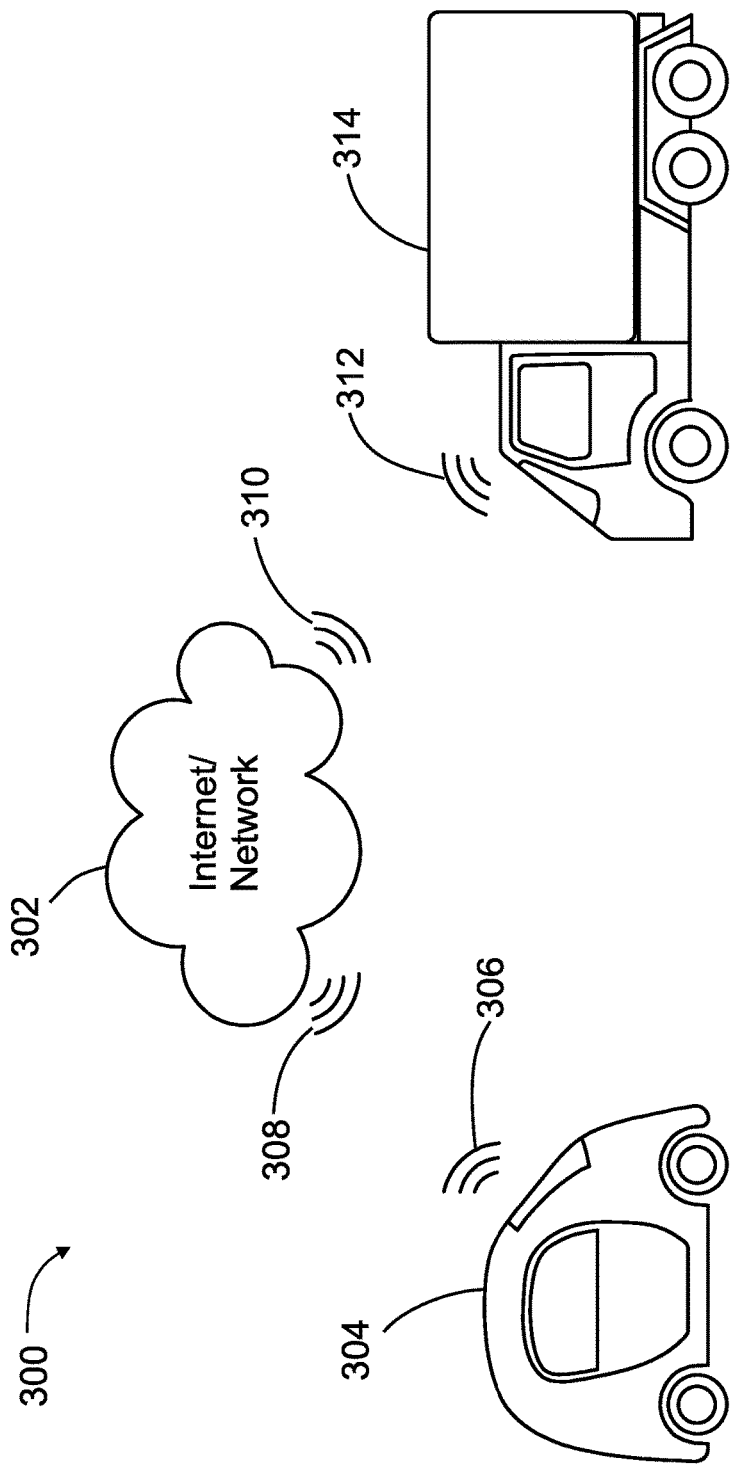
FIG. 3 is a schematic of communications used between a vehicle, a network, and a mobile fuel station.

FIG. 3 shows a communication schematic 300 in which a vehicle 304 is sending a signal 306 comprising vehicle status and vehicle location data to a network 302. The vehicle status data may include information about the vehicle owner including owner name, birth date, user picture, home address, work address, phone number, occupation, bank account, payment service account, credit card, debit card, payment schedule, refueling schedule, preferred refueling location, vehicle year, vehicle make, vehicle model, vehicle color, vehicle VIN number, license plate number, fuel type, fuel company, or a combination thereof. The vehicle status may also include information about the vehicle itself, such as an automobile VIN number, vehicle year, vehicle make, vehicle model, vehicle color, and/or fuel cap location. The vehicle status may include a fuel level or a low fuel indication. Additionally, the vehicle status may include indications that maintenance services need to be carried out, such as an oil change, transmission fluid change, windshield washing fluid top-off, vehicle cleaning, surface polishing, tire inflation, or wiper replacement. Indications that maintenance services need to be carried out may be triggered automatically when sensors in the vehicle 304 detects that a maintenance service needs to be carried out, or by manual controls when a vehicle occupant or owner chooses to request a maintenance service by triggering an indicator by means of mechanical or digital buttons in the vehicle or on a digital display such as on a webpage or a vehicle occupant's mobile device. The network 302 may be a cloud-based server communicating via internet. The network 302 may also comprise a remote computer that has computational power sufficient to not only receive, transmit, and store data, but also to carry out data analysis, one embodiment of data analysis being described hereafter in FIG. 12. The network 302 is capable of transmitting a signal 308 to the vehicle 304 which may contain data such as a refueling rendezvous location or an estimated time to until the mobile fuel station 314 arrives. The vehicle 304 may be an autonomous or driverless vehicle, in which case the vehicle 304 could move to a received rendezvous location autonomously. The network 302 is also capable of transmitting a signal 310 to the mobile fuel station 314. The signal 310 may comprise the same information as the signal 306 sent from the vehicle 304 to the network 302. In addition, the signal 310 may include data produced by the network 302 such as a predicted vehicle location, or a mobile fuel station route produced by the network based on an analysis of vehicle location history or patterns. The mobile fuel station 314 is also shown transmitting a signal 312 which may include the mobile fuel station's location, fuel reservoir levels, or indications that a service has been completed.

Figure 4:
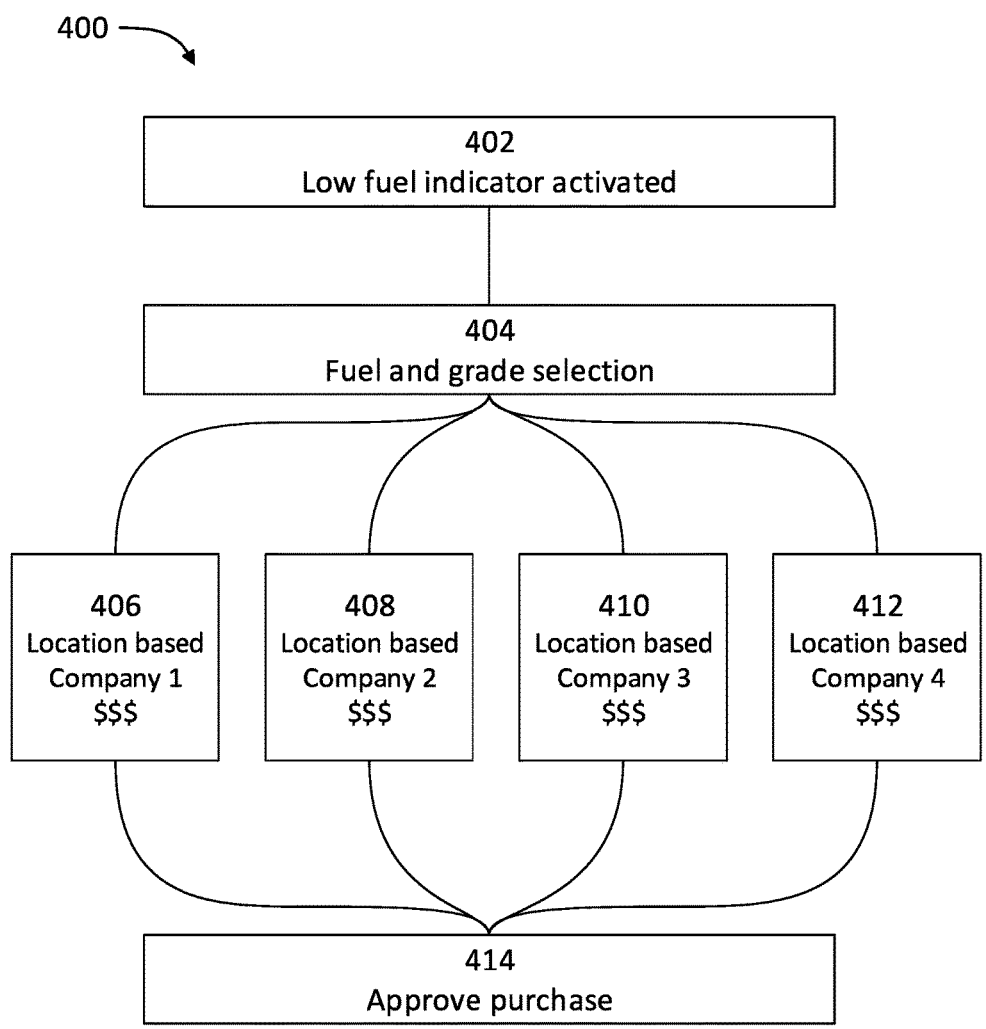
FIG. 4 is a block diagram of first embodiment of a service selection.

FIG. 4 shows a block diagram 400 of an example service selection that may be provided to a customer utilizing the mobile refueling system or method. A low fuel indicator is activated 402 either by a sensor that automatically detects a low fuel level in a vehicle, or by manual activation by a vehicle occupant through a mechanical button or digital button on a digital display. Upon activation of the low fuel indicator 402, the network would create a fuel and grade selection 404 to allow the customer to choose the type and price of their refueling service. The network would then compile fuel company and price options 406, 408, 410, 412 and display them to the customer. The options 406, 408, 410, 412 may be displayed through a mobile device application, on a website, or even on a digital display in the vehicle. Upon selection of one of the fuel company and price options 406, 408, 410, 412 by the customer, the customer is prompted to approve the purchase 414.

Figure 5:
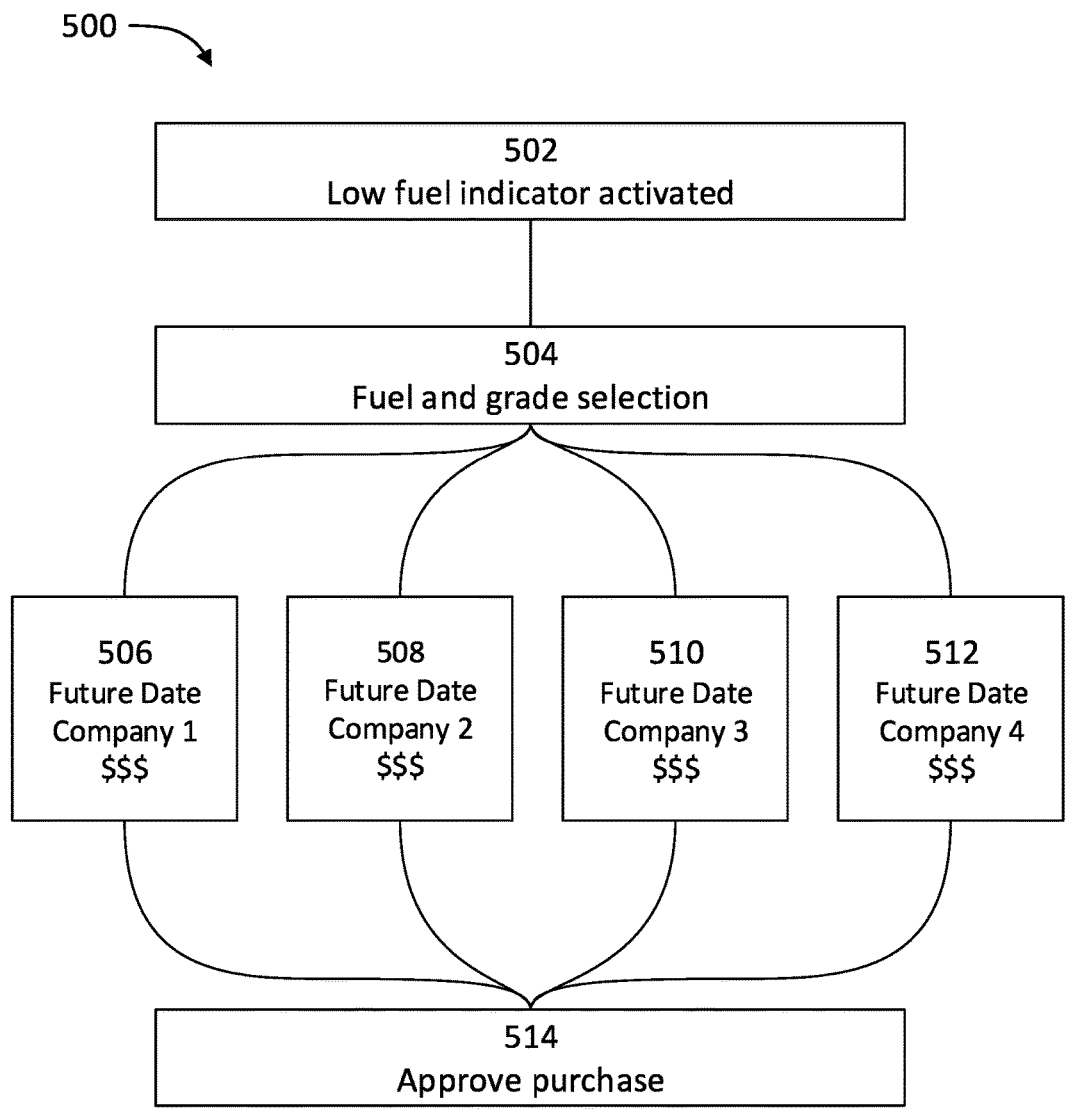
FIG. 5 is a block diagram of a second embodiment of a service selection.

FIG. 5 shows a second block diagram 500 of an example service selection that may be provided to a customer utilizing the mobile refueling system or method. A low fuel indicator is activated 502 either by a sensor that automatically detects a low fuel level in a vehicle, or by manual activation by a vehicle occupant through a mechanical button or digital button on a digital display. Upon activation of the low fuel indicator 502, the network would create a fuel and grade selection 504 to allow the customer to choose the type and price of their refueling service on a future date. The network would then compile future date, fuel company, and price options 506, 508, 510, 512 and display them to the customer. The options 506, 508, 510, 512 may be displayed through a mobile device application, on a website, or even on a digital display in the vehicle. Upon selection of one of the one of the options 506, 508, 510, 512 by the customer, the customer is prompted to approve the purchase 514. Purchasing a future refueling service has the added benefit of allowing the network to plan more efficient refueling routes and refueling locations, thus reducing overhead and traveling costs. Thus a customer may be offered a discounted price for selection of a refueling service on a future date. Other service selections may also be provided to a customer using one or more service options including future refuel date, fuel company, fuel cost, refuel location, refuel time, payment method, and payment receipt method.

Figure 6:
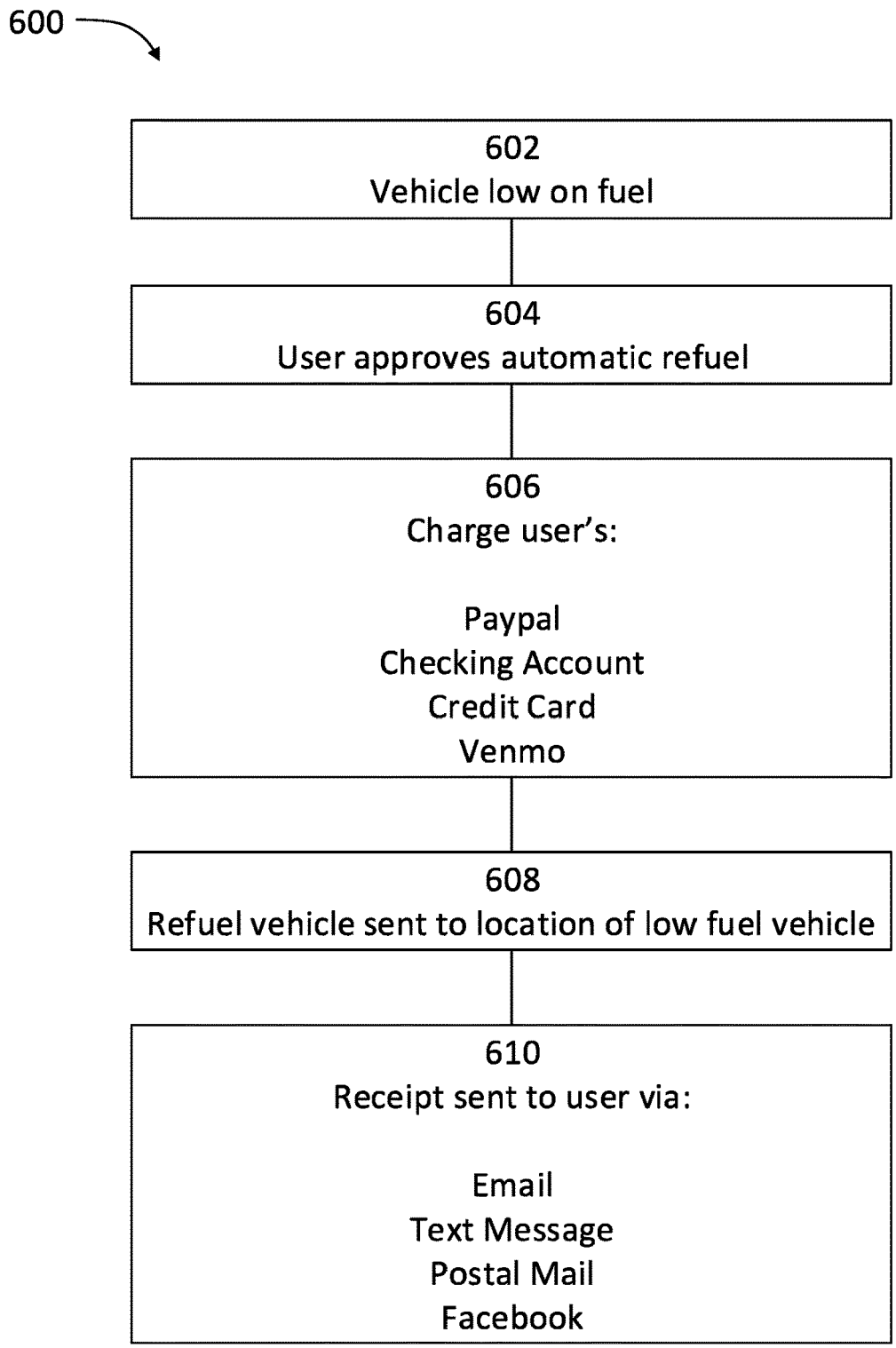
FIG. 6 is a block diagram of a first embodiment of an automatic refueling system whereby a customer is automatically charged for services.

FIG. 6 shows a block diagram 600 of an automatic refueling system in which a customer can be automatically charged for a refueling service possibly without having had to plan or request it. The system's automatic process begins when vehicle is low on fuel 602, at which time it the vehicle uses the first communication device to communicate to the network and request a refueling service. The request can be sent automatically when a vehicle sensor detects that a fuel level in the vehicle is low. The request can also be manually triggered by a physical button or switch or digital button which a customer uses. Upon receiving the refueling request, a customer is sent a notification that the vehicle is low on fuel and gives the customer the option to approve of an automatic refuel. This notification may be sent to a customer's mobile device application, texted to a customer's mobile phone, or emailed to a customer's email address. When the user approves automatic refuel 604, the network may automatically charge a user 606 through a payment service such as Paypal, a user's checking account, a user's credit card, or Venmo. Upon charging a user 606, the network sends a command through the second communication device to the mobile fuel station. The command may comprise the location of the vehicle and the vehicle's status. The refuel vehicle is then sent to the location of the low fuel vehicle 608 either by means of commands to an autonomous vehicle or by means of a human operator who manually operates the vehicle to take it to the location of the low fuel vehicle. Upon completion of the refueling service, the mobile fuel station transmits a signal to the network indicating that the refueling service was completed. The network then sends a receipt to the user 610, which may be sent using email, text message, postal mail, or Facebook messaging. The receipt may serve as a service notification to the user. Alternatively, upon completion of refueling and maintenance services, a service notification may be sent to the user comprising details such as time and location of servicing, refueling services provided, maintenance services provided, fuel type, fuel cost, fuel quantity, maintenance service cost, or a combination thereof.

Figure 7:
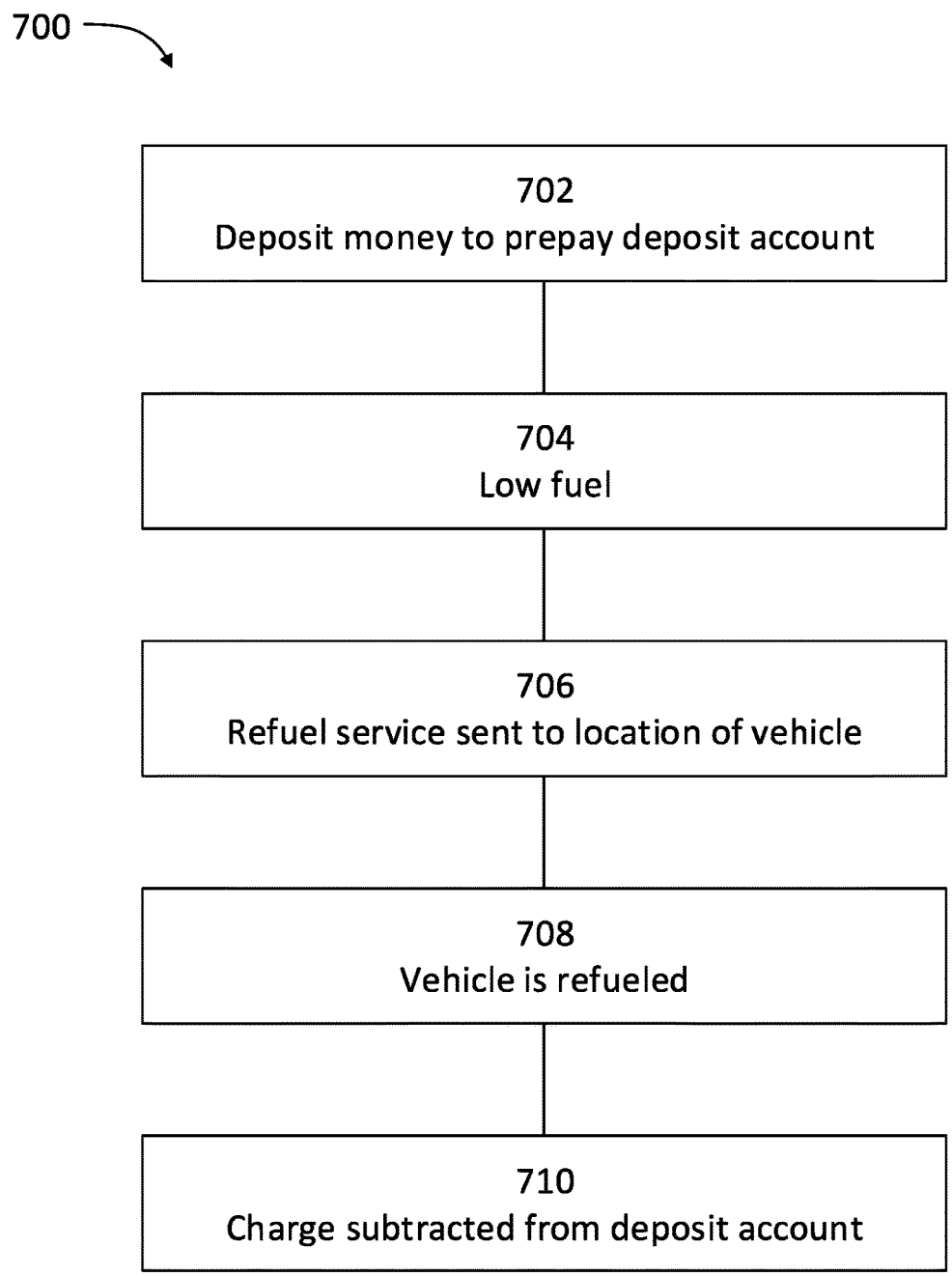
FIG. 7 is a block diagram of a second embodiment of an automatic refueling system whereby a customer is automatically charged for services.

FIG. 7 shows a second block diagram 700 of an automatic refueling system in which a customer can be automatically charged for a refueling service possibly without having had to request it. The system's automatic process begins when a user deposits money into a prepay deposit account 702. Upon detection of a low fuel level 704 in a vehicle, the vehicle then sends a refueling service request to the network through the first communication device. The network then sends a signal to the mobile fuel station through the second communication device. A mobile fuel station is then sent to the location of the vehicle 706, and the vehicle is refueled 708 by a mobile refueling service provided by the mobile fuel station. Upon completion of the refueling service, a signal is sent from the mobile fuel station to the network through the second communication device. The network may then charge the customer by subtracting from the prepay deposit account 710.

Figure 8:
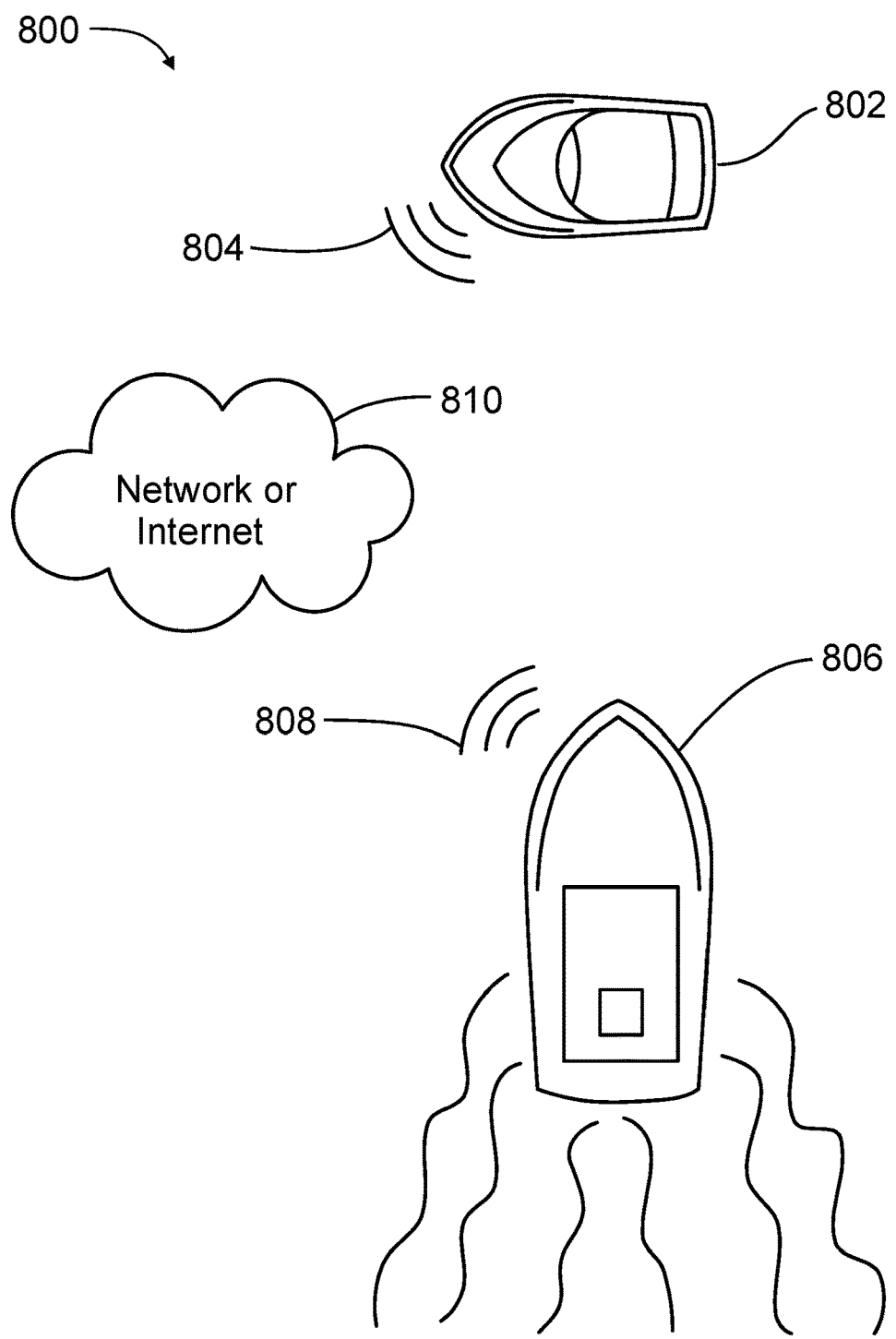
FIG. 8 is a schematic of a sea-based mobile refueling system.

FIG. 8 shows a sea-based mobile refueling system 800. A sea-based vehicle 802 is shown sending a signal 804 to a network 810, the signal 810 comprising the vehicle's location and status. A mobile fuel station 806 is also shown sending a signal 808 to the network, the signal comprising the mobile fuel station's location and status. The mobile fuel station 806 may receive the vehicle's location and status from the network 810, and subsequently travel to the vehicle 802 to perform a refueling service. The sea-based mobile refueling system 800 shows that the present invention may be applied to all forms of vehicles, including those used on land, sea, or air.

Figure 9:
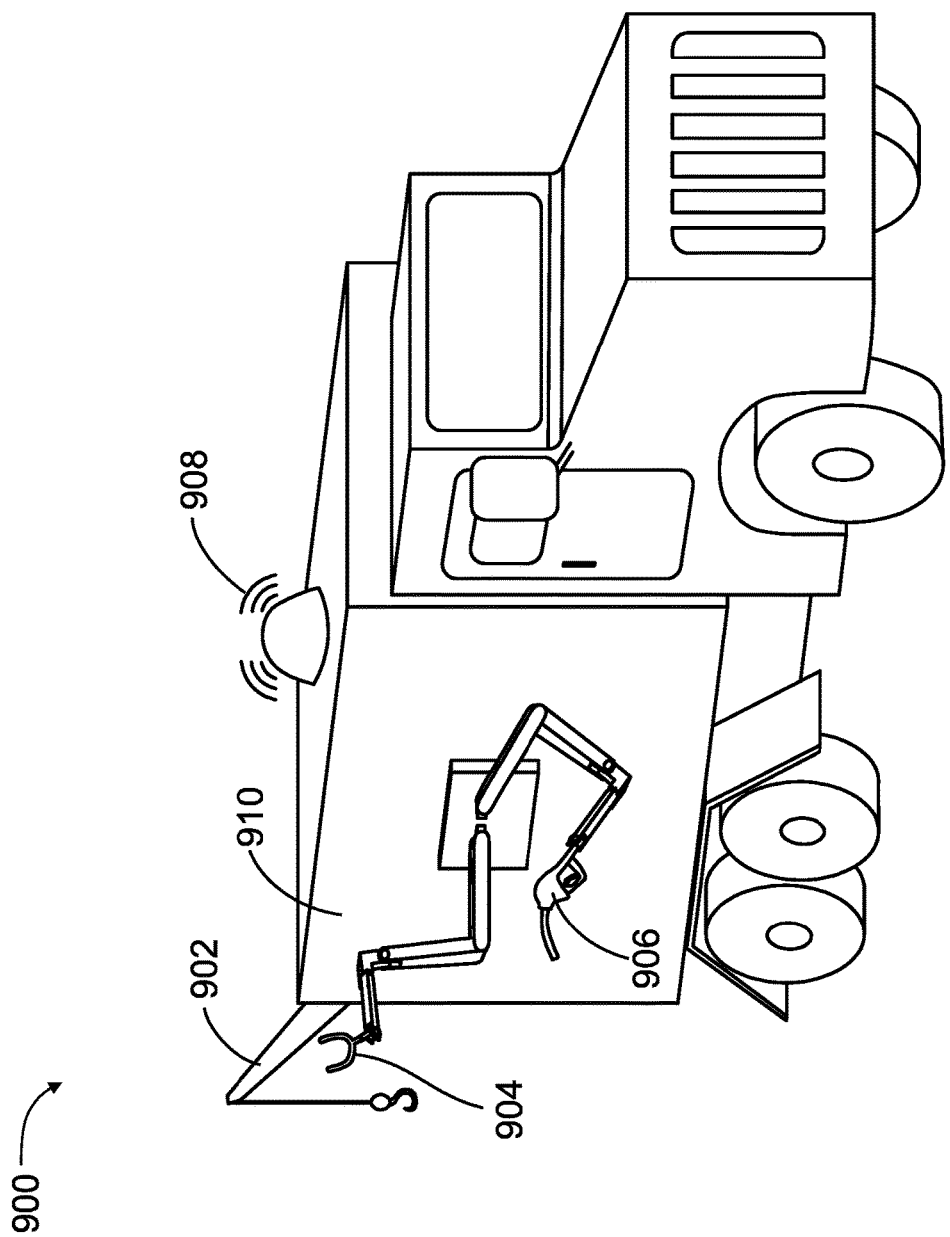
FIG. 9 is a mobile fuel station with a communication device and additional apparatuses for maintenance services.

FIG. 9 shows a mobile fuel station 900. The mobile fuel station 900 comprises a first communication device which may send and receive a signal 908 to and from a network. The mobile fuel station 900 may further comprise additional apparatuses 902, 904, 906 which allow the mobile fuel station 900 to perform maintenance services in addition to a refueling service, perform a refueling service autonomously, or assist a human operator in a refueling service. A tow crane 902 is shown attached to the mobile fuel station, which may allow the mobile fuel station to tow a vehicle. The tow crane 902 may also be used to simply lift a portion of the vehicle, thus allowing ease of access to components on the underside of the car and facilitating other maintenance services. A fuel cap grip 904 and a fuel pump 906 are shown attached to a side 910 of the mobile fuel station by means of robotic arms. A preprogrammed autonomous system may utilize the fuel cap grip 904 to open a fueling panel, release a gas cap, and tighten a gas cap on the vehicle being refueled. A preprogrammed autonomous system may utilize the fuel pump 906 to insert fuel into the vehicle. Alternatively, the fuel pump 906 may be operated manually by a human operator. The mobile fuel station 900 may further comprise additional apparatuses allowing one or more human operators or preprogrammed autonomous systems to carry out additional maintenance services such as an oil change, transmission fluid change, windshield washing fluid top-off, vehicle cleaning, windshield replacement, rock chip repair, headlight cleaning, surface polishing, tire inflation, and wiper replacement.

Figure 10:
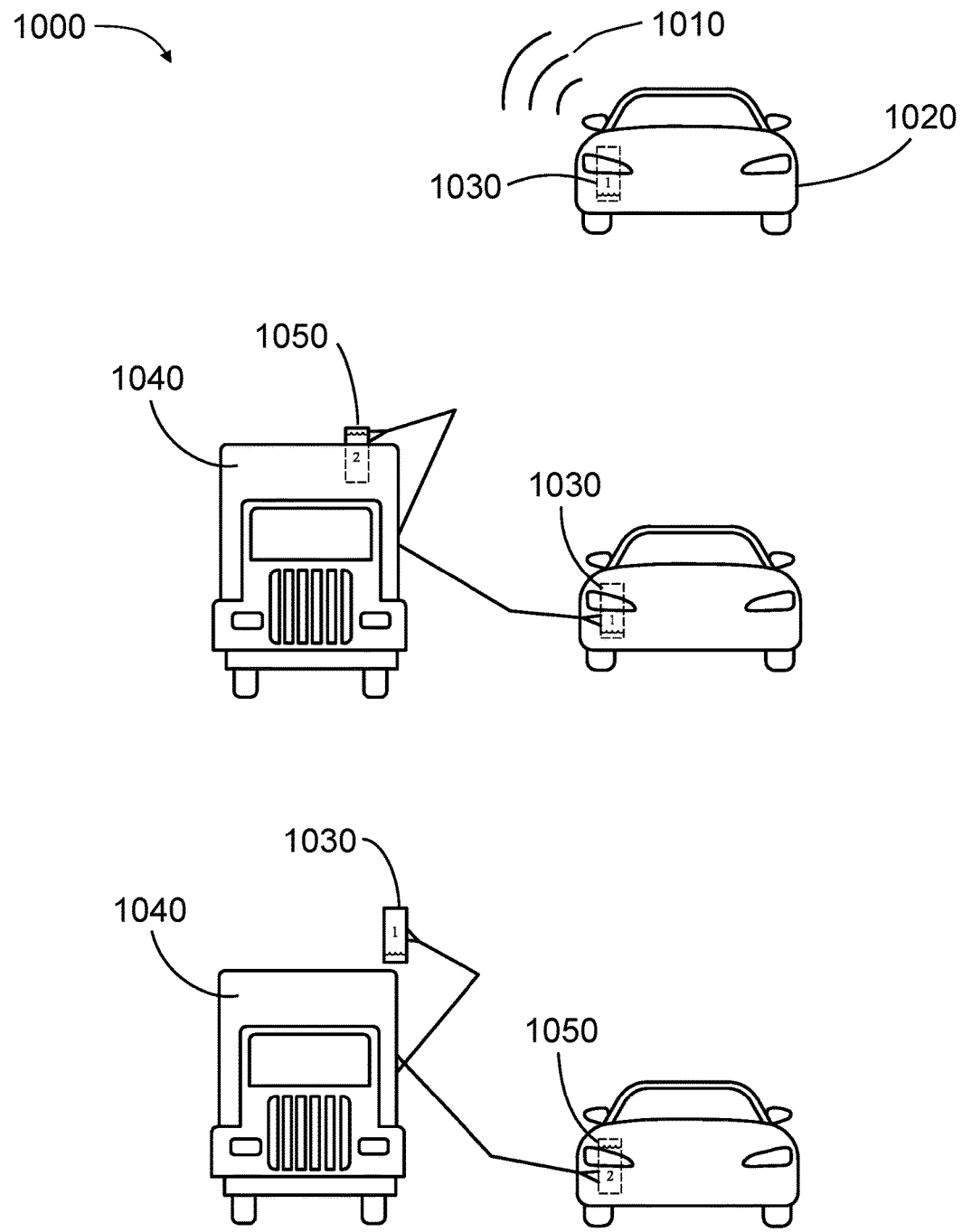
FIG. 10 is a schematic showing a refueling service using fuel modules.

FIG. 10 shows a fuel module refueling service 1000 in which a vehicle 1020 having a fuel module 1030 sends a signal 1010 to a network indicating that the fuel module 1030 is low on fuel. A mobile fuel station 1040 is sent to the vehicle's location as communicated through the signal 1010. The mobile fuel station 1040 comprises a replacement fuel module 1050 which is filled at least partially with fuel. The mobile fuel station 1040 may use robotic arms to remove the fuel module 1030 from the vehicle and replace it with the replacement fuel module 1050. A vehicle having a fuel module 1030 increases the efficiency of a refueling process by reducing refueling time, which is longer when a fuel tank or reservoir must be filled rather than a fuel module replaced. In addition, a vehicle with a fuel module 1030 may increase the ease of autonomous refueling by means of robotic arms. Although FIG. 10 shows the mobile fuel station 1040 carrying out the refueling service by means of robotic arms, one or more human operators may also carry out the refueling service by manually removing the fuel module 1030 and replacing it with a replacement fuel module 1030. The fuel module 1030 and the replacement fuel module may contain liquid fuel, gas fuel, or an electrical battery. Refueling time is substantially reduced when the fuel module 1030 and the replacement fuel module 1050 comprise a battery, because charging times for batteries of electric vehicles often range from anywhere between 4 and 20 hours.

Figure 11:
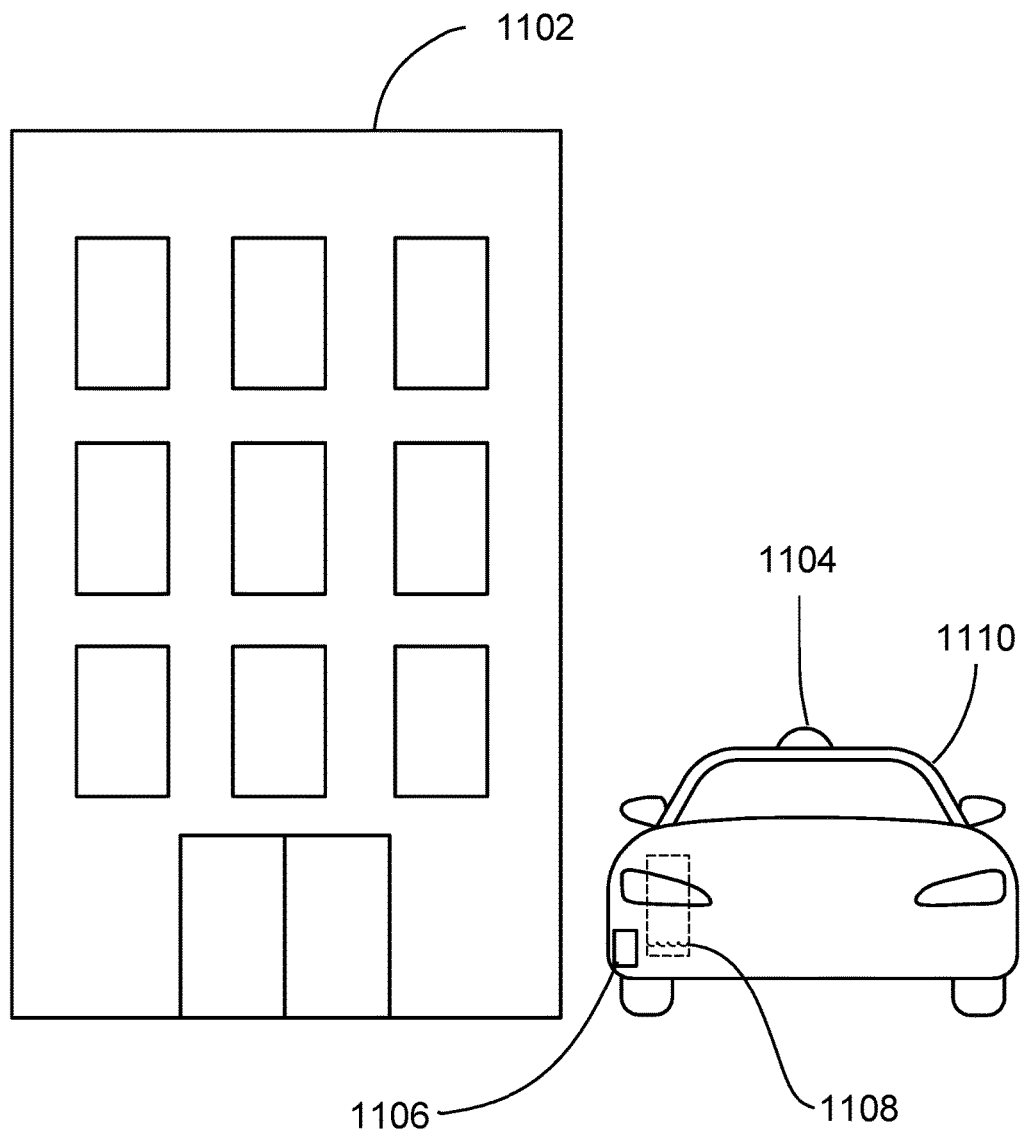
FIG. 11 shows a vehicle with a proximity sensor parked adjacent a building.

FIG. 11 shows a vehicle 1110 parked near a building 1102. The building 1102 may be a place of employment, permanent residence, or temporary residence of a vehicle owner. A refueling service is particularly convenient for a vehicle owner when the refueling service takes place while the vehicle owner is not in the vehicle and can be fully engaged in separate activities, thus eliminating the need for the vehicle owner to expend time, energy, or fuel to refuel the vehicle 1110 him/herself. The vehicle 1110 is shown to comprise a first communication device 1104 used to communicate with a network. The vehicle 1110 further comprises a fuel module with a low fuel level 1108 and a proximity sensor 1106. The proximity sensor 1106 is capable of detecting when the vehicle 1110 is too close to a building 1102 or other obstacle to be reached by a human operator or autonomous system carrying out a refueling service. The proximity sensor 1106 is placed on the same side of the vehicle 1110 as the fuel module or may also be placed on the same side as a fuel cap or fuel panel found on the vehicle 1110. The proximity sensor may be placed adjacent to the location of the fuel module, fuel cap, or fuel panel in order increase the chance of detection of an obstruction that may restrict access and prevent a refueling service from being carried out.

Figure 12:
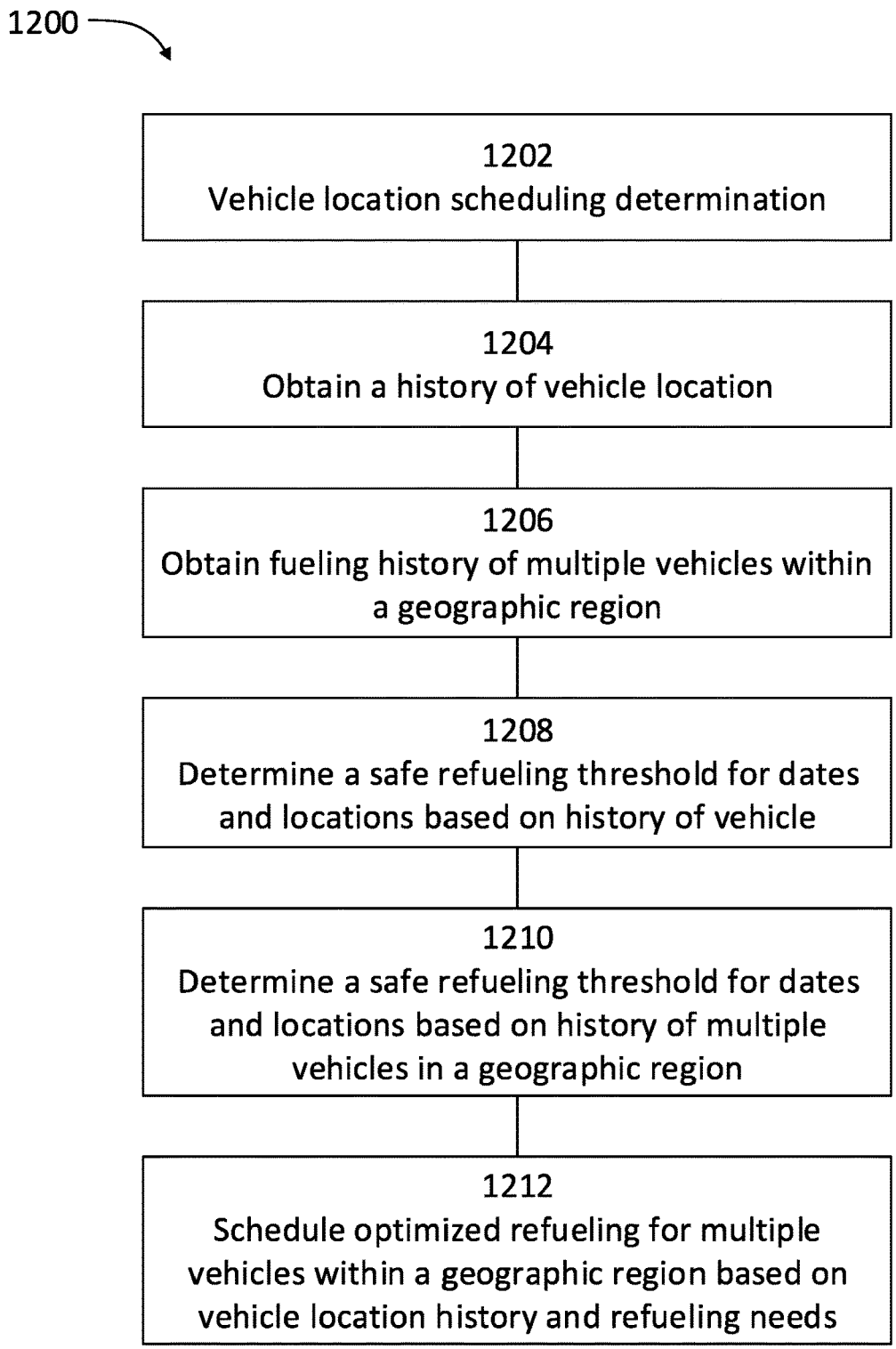
FIG. 12 is a block diagram of a data analysis that may be carried out by a network.

FIG. 12 shows a block diagram 1200 of a data analysis that may be carried out by the network. The data analysis may comprises a vehicle location scheduling determination 1202, which may begin by obtaining a history of a vehicle's location 1204 by using location data received and stored in the network. Location history may be compiled and sequenced with time data in order to create a travel history, which indicates the travel routes a vehicle has taken in the past. The data analysis may then comprise obtaining a fueling history of multiple vehicles within a geographic region 1206. The data analysis may then comprise determining a safe refueling threshold for dates and locations based on history of a vehicle 1208. A safe refueling threshold uses vehicle location history and refueling dates to determine a range of dates and locations at which a refueling must occur for the vehicle to avoid running out of fuel while traveling along a regular route accounted for in the vehicle location history. This analysis may be repeated for more vehicles to determine a safe refueling threshold for dates and locations based on histories of multiple vehicles in a geographic region 1210. Safe refueling threshold dates and locations may also be used to create a predicted vehicle location and a predicted refueling location. Using the combined safe thresholds, the network may then complete the data analysis by scheduling optimized refueling for multiple vehicles within a geographic region based on vehicle location history and refueling needs 1212. The optimized refueling may comprise several predicted vehicle locations or predicted vehicle refueling locations created by the computer. Optimized refueling may further comprise an optimized refueling path, which is a path determined by the network that would reduce the distance a mobile fuel station would have to travel or decrease the amount of time that refueling one or more vehicles would take. The data analysis represented by the block diagram 1200 may have the advantage of reducing travel time for the mobile fuel station, thus decreasing refueling service cost without inconveniencing a vehicle owner. Furthermore, optimized refueling significantly reduces the amount of overall time and fuel wasted by vehicle owners in traveling to refueling sites and performing refueling services on their own.

Figure 13:
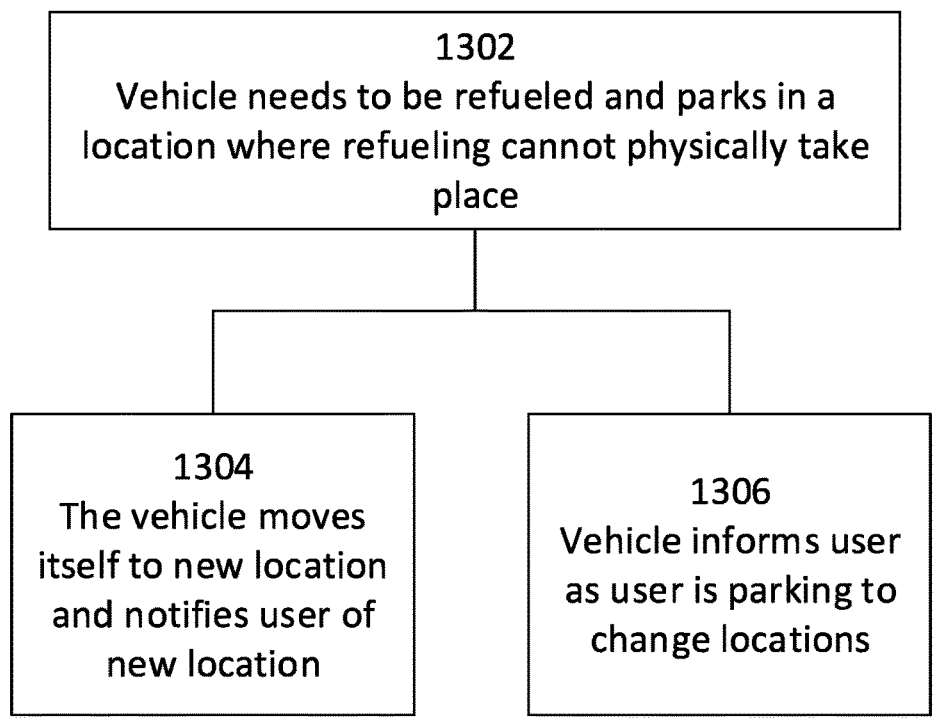
FIG. 13 is a block diagram of how a vehicle may react when it detects that a refueling service cannot be performed in a parking location.

FIG. 13 shows a block diagram 1300 representing how a vehicle may react when a proximity sensor or other device detects the vehicle to be in a location in which a refueling service cannot physically take place. Upon detection that the vehicle needs to be refueled and parks in a location where refueling cannot physically take place 1302, the vehicle may move itself to a new location autonomously 1304. Moving itself to a new location autonomously 1304 may also comprise sending a notification to the user through a predetermined medium so that the user is aware of the new location of their vehicle. Alternatively, the vehicle may inform the user that they need to change parking locations 1306 by means of a parking warning. A parking warning is especially useful for vehicles that cannot be autonomously operated. The parking warning may be in the form of a visual indicator on the visual display of the vehicle, an audible indicator using the vehicle's sound system, or a combination of both a visual and audible indicator.

Figure 14:
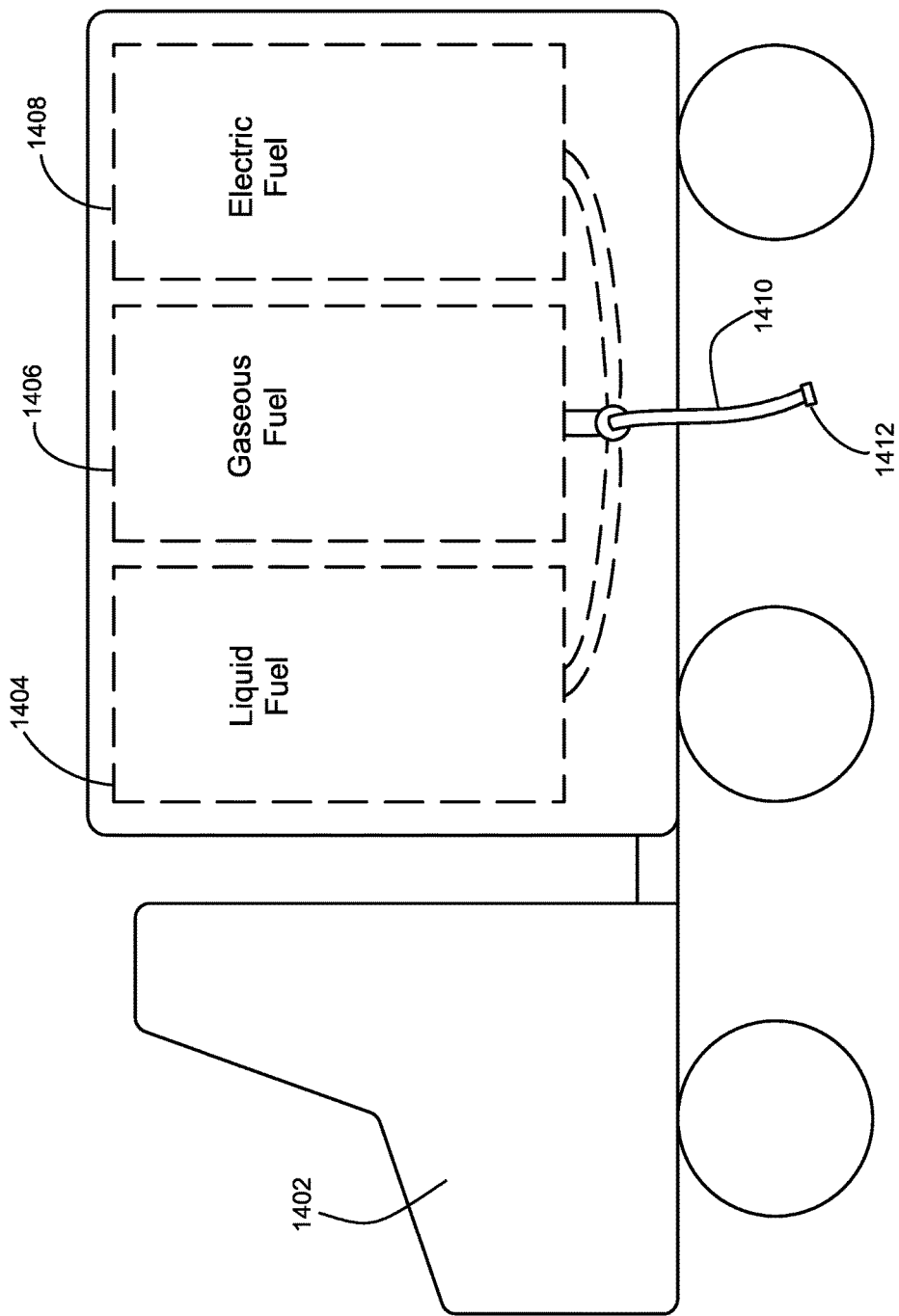
FIG. 14 is a schematic of a mobile fuel station having fuel reservoirs and a hybrid fuel line.

FIG. 14 shows a mobile fuel station 1402 having fuel reservoirs 1404, 1406, 1408 which are connected to a hybrid fuel line 1410. The fuel reservoirs 1404, 1406, 1408 are capable of storing fuel and dispensing fuel through the hybrid fuel line 1410. The liquid fuel reservoir 1404 may be a conventional fuel tank used commonly in automobiles. The liquid fuel reservoir 1404 is shown being higher than the hybrid fuel line 1410 such that if liquid fuel were dispensed through the hybrid fuel line 1410, the force of gravity would be sufficient to dispense fuel and would not require a fuel pump. In other configurations, the liquid fuel reservoir 1404 may be connected to a fuel pump in order to dispense liquid fuel. The gaseous fuel reservoir 1406 may contain natural gas, propane, or other gaseous fuels. The gaseous fuel reservoir 1406 may be pressurized so that gaseous fuel is dispensed through the hybrid fuel line 1410 and into a fuel tank or fuel module of lower pressure in a vehicle. The electric fuel reservoir 1408 may comprise a pre-charged battery bank, a dynamically charging battery bank, or electric power generator capable of dispensing electrical power through electrical wires in the hybrid fuel line 1410. The mobile fuel station 1402 may utilize solar panels to charge the electric fuel reservoir 1408 while the mobile fuel station 1402 is moving or while it is stationary. The mobile fuel station 1402 may comprise an alternator or auxiliary power unit which charges the electric fuel reservoir while the mobile fuel station 1402 is moving or while it is stationary. The hybrid fuel line 1410 comprises a nozzle interface 1412 which is used to detachably connect a fuel nozzle to the hybrid fuel line 1410 in a manner described in FIGS. 17A and 17B.

Figure 15:
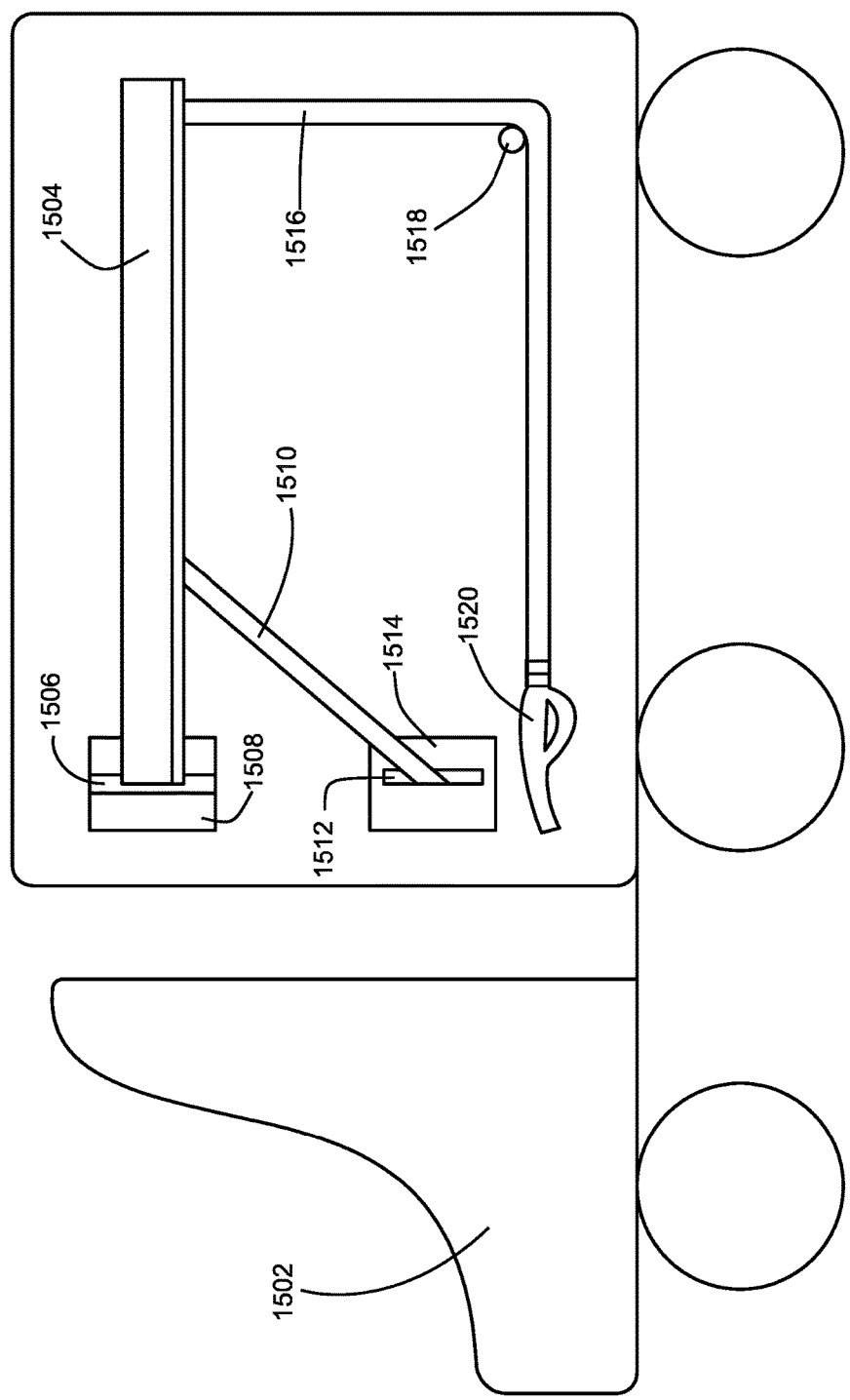
FIG. 15 shows a mobile fuel station having a cantilevered column to hang a fuel line.

FIG. 15 shows a mobile fuel station 1502 having a cantilevered column 1504 used to hang a fuel line 1516. The cantilevered column 1504 is pivotally attached to a side of the mobile fuel station by means of a first hinge 1506 and a first plate 1508, the first plate 1508 being rigidly attached to the mobile fuel station and the first hinge 1506 allowing the cantilevered column 1504 to rotate and extend the fuel line 1516 away from the mobile fuel station 1502. The cantilevered column 1504 is supported in its cantilevered orientation by a support column 1510, which is also pivotally attached to the side of the mobile fuel station by means of a second hinge 1512 and a second plate 1514. The fuel line 1516 extends along at least part of the cantilevered column 1504 from the mobile fuel station 1502. The fuel line 1516 may be connected to a fuel nozzle 1520 which is storable on the side of the mobile fuel station 1502. To prevent the fuel line from sagging, a rod 1518 may be used to direct the length of the fuel line 1516 along a desirable path on the side of the mobile fuel station. The cantilevered column 1504 allows the fuel line 1516 and fuel nozzle 1520 to be extended away from the mobile fuel station as shown in FIG. 16.

Figure 16:
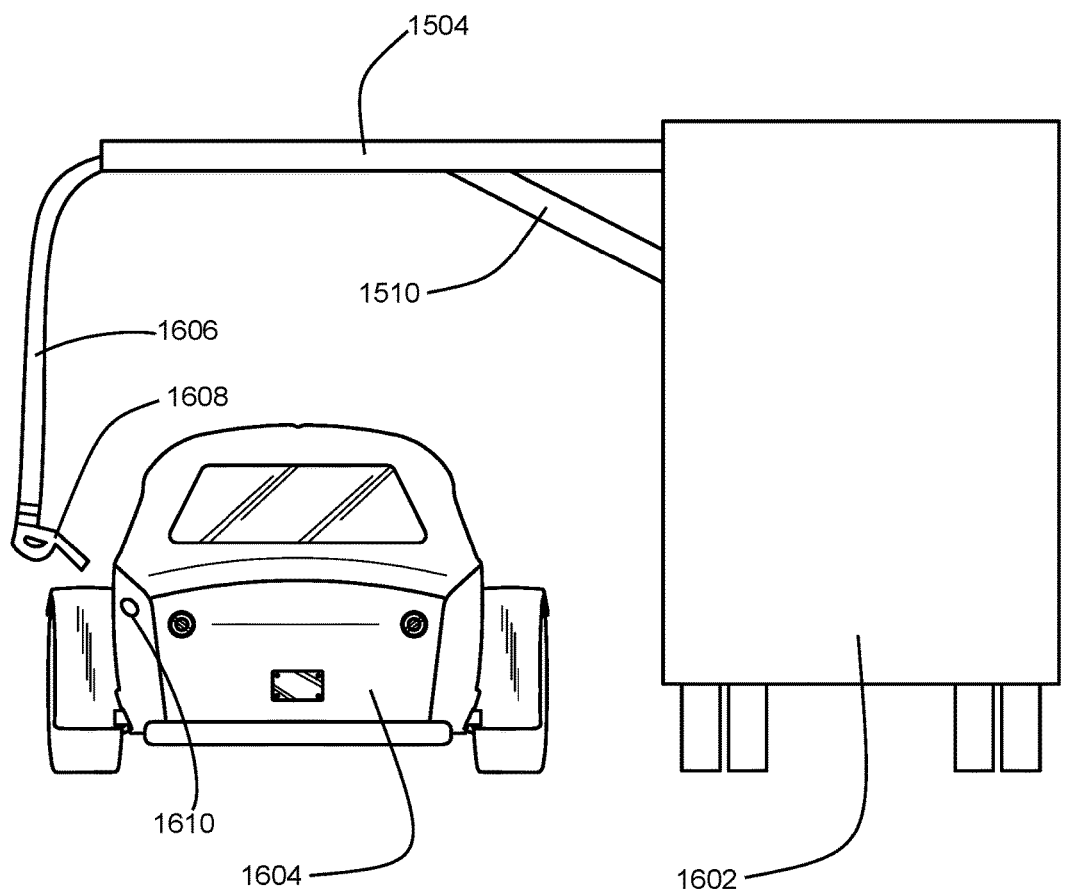
FIG. 16 shows a mobile fuel station having a cantilevered column and hanging a fuel line above a vehicle to reach a fueling location.

FIG. 16 shows a mobile fuel station 1602 having a cantilevered column 1504 and support column 1510 extending away from the mobile fuel station 1602 so that a fuel line 1606 and fuel nozzle 1608 can reach a fueling location 1610 on a vehicle 1604. The cantilevered column 1504 and support column 1510 are rotated in the position shown using hinges. The cantilevered column 1504 allows the fuel line 1606 to be extended above the vehicle 1604. Hanging the fuel line 1606 from the cantilevered column 1504 prevents fuel line tangling, wear, and damage that may be caused by debris, cyclists, pedestrians, or vehicle operators. Upon completion of a refueling service, the cantilevered column 1504 and attached support column 1510, fuel line 1606, and fuel nozzle 1608 may be rotated back towards the mobile fuel station for storage as shown in FIG. 15.

Figure 17A:
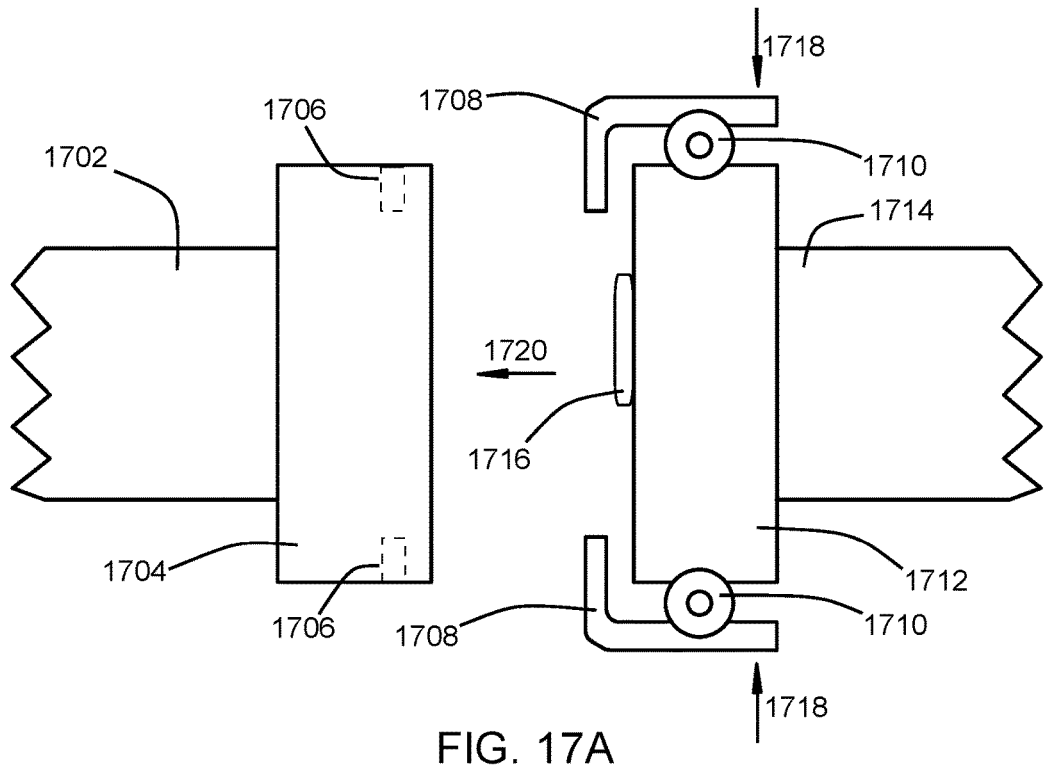
FIGS. 17A and 17B show a fuel nozzle having a latch and a hybrid fuel line, and a method of detachably connecting the same.
Figure 17B:
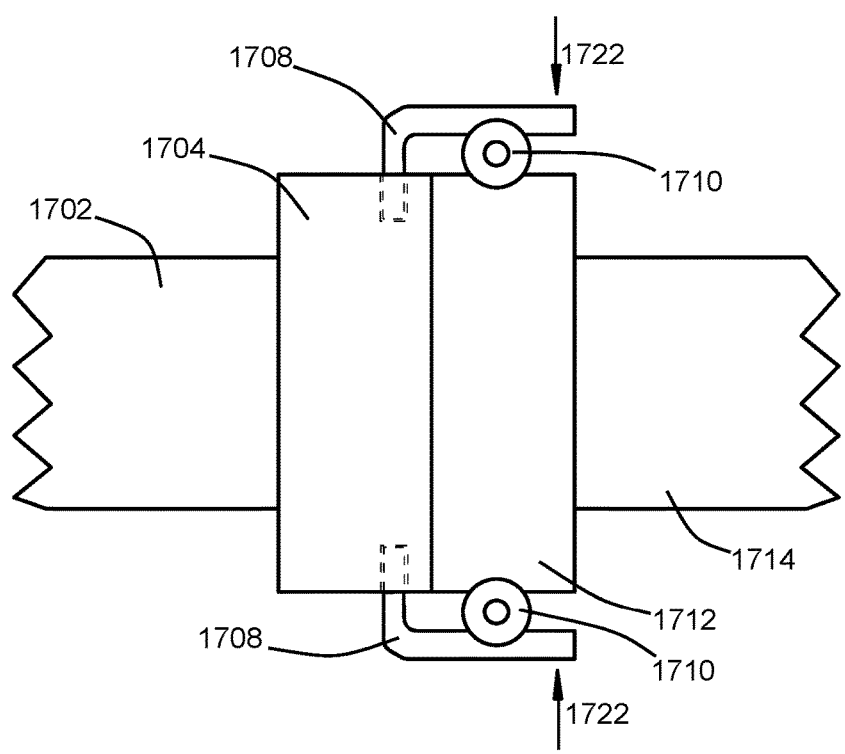

FIGS. 17A and 17B show the manner in which a fuel nozzle 1714 may be detachably connected to a hybrid fuel line 1702. Regarding FIG. 17A, a hybrid fuel line 1702 is shown having a nozzle interface 1704 with latch slots 1706. A fuel nozzle 1714 is also shown having a fuel line interface 1712, the fuel line interface 1712 having latch pivots 1710 and latches 1708. The fuel line interface 1712 may also have a fuel seal 1716, which ensures that upon latching of the fuel line interface 1712 to the nozzle interface 1704, a fuel dispensed through the nozzle without leaking. The fuel seal 1716 may be used to prevent a liquid fuel leak, maintain a fuel pressure, or insulate electrical current passing through the seal form other components or fuels. The latch pivots 1710 may comprise torsional springs so that the latches 1708 rest in a closed position as shown. To attach a fuel nozzle 1714 to the hybrid fuel line 1702, the latches 1708 are pressed 1718 to rotate the latches about the latch pivots 1710 and cause the latches 1708 to be in an open state. The fuel line interface 1712 is then caused to interface 1720 with the nozzle interface 1704 and the latches 1708 may be released such that the latches 1708 mate with the slots 1706. FIG. 17B shows the fuel nozzle 1714 being detachably connected to the hybrid fuel line 1702. The fuel line interface 1712 is interfaced flush against a surface of the nozzle interface 1704. The latches 1708 are in a closed position being mated with slots in the nozzle interface 1704. The latches 1708 prevent the fuel nozzle 1714 from being separated from the hybrid fuel line 1702. The fuel nozzle may be detached from the hybrid fuel line by opening the latches 1708 by pressing 1722 on the latches 1708 such that the latches 1708 rotate about the latch pivots 1710.

Figure 18:
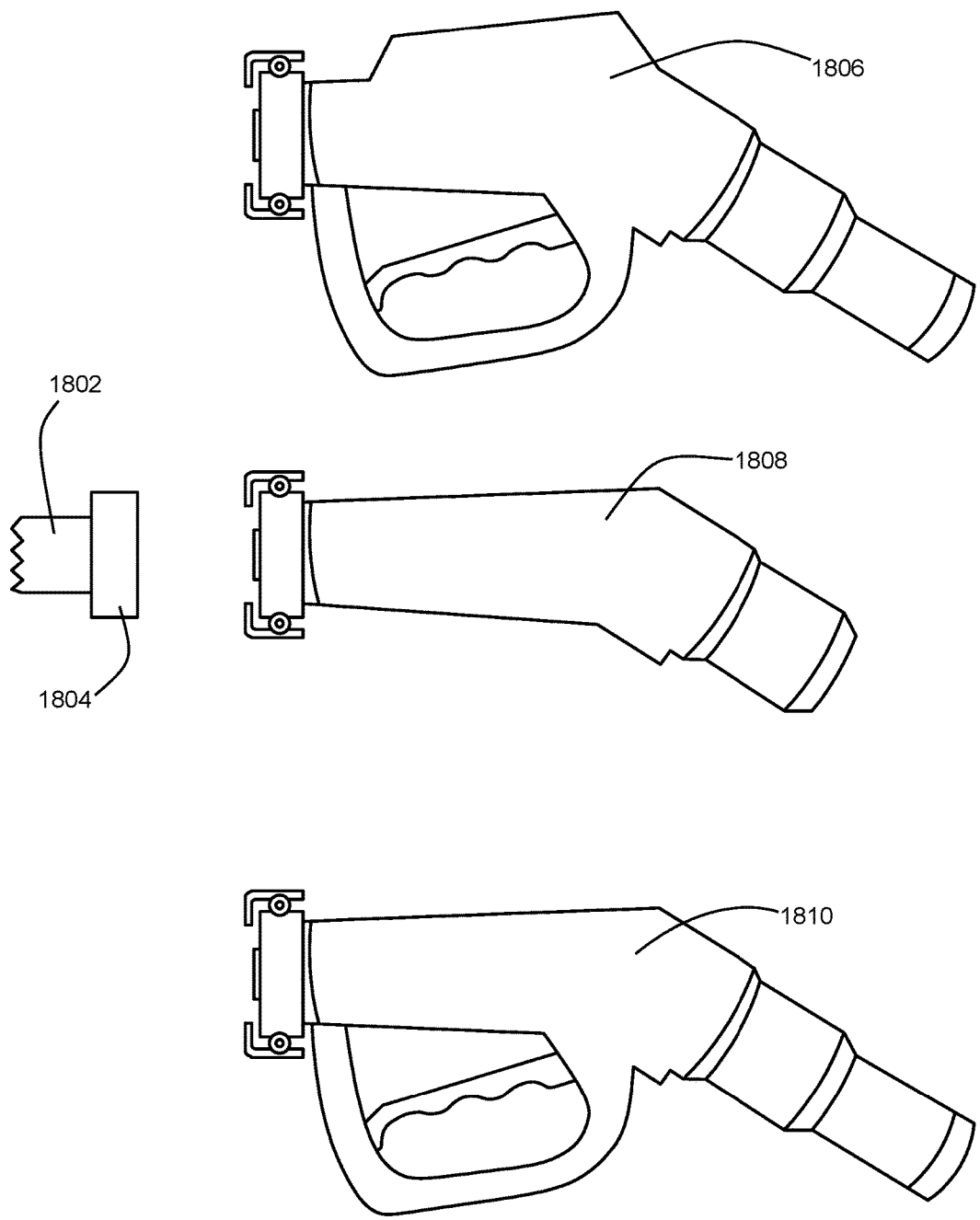
FIG. 18 shows three fuel nozzles which may be detachably connected to the hybrid fuel line.

FIG. 18 shows a plurality of fuel nozzles 1806, 1808, 1810 which may be detachably connected to a hybrid fuel line 1802 by means of a nozzle interface 1804. A liquid fuel nozzle 1806 may be detachably connected to the hybrid fuel line as shown in FIGS. 17A and 17B in order to dispense liquid fuel from the mobile fuel station into a vehicle, thereby at least partially completing a refueling service. An electric fuel nozzle 1808 may be detachably connected to the hybrid fuel line as shown in FIGS. 17A and 17B in order to pass an electrical current from the mobile fuel station into a vehicle, thereby at least partially completing a refueling service. A gaseous fuel nozzle 1810 may be detachably connected to the hybrid fuel line as shown in FIGS. 17A and 17B in order to dispense a gaseous fuel from the mobile fuel station into a vehicle, thereby at least partially completing a refueling service.

Figure 19A:
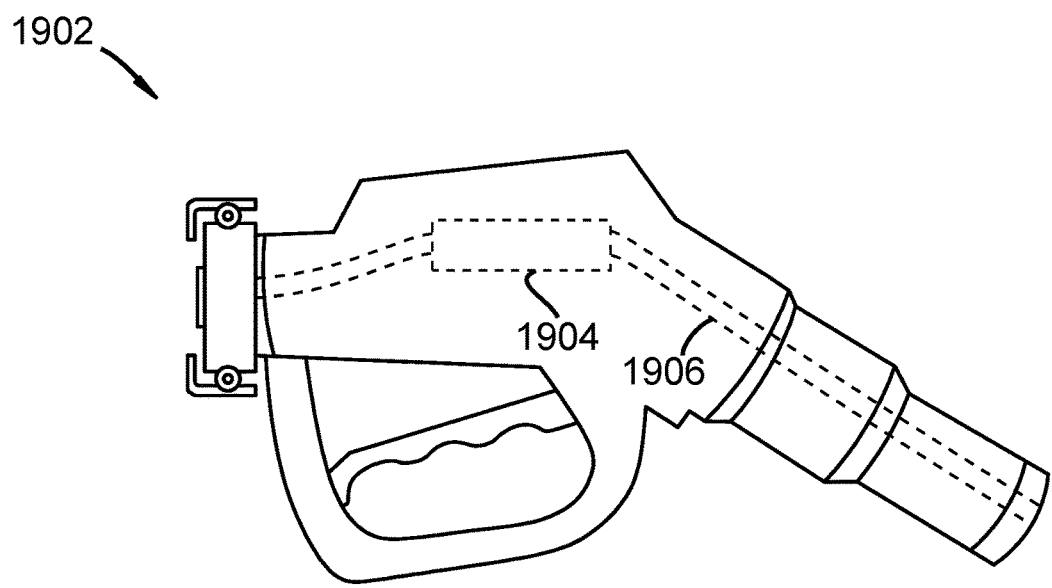
FIGS. 19A and 19B show a side view and top view respectively of a fuel nozzle having a measurement device and a display.
Figure 19B:
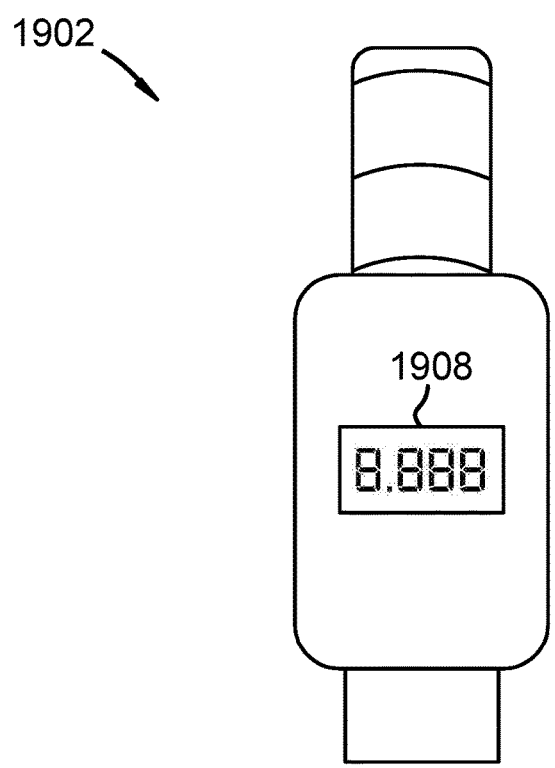

FIG. 19A shows a fuel nozzle 1902 comprising a measurement device 1904 which is capable of measuring the volume of liquid fuel dispensed through a fuel dispensing channel 1906. The measurement device 1904 may be a mass flow meter, a volumetric flow meter, or a flow rate meter. FIG. 19B shows a top view of the fuel nozzle 1902 and shows the fuel nozzle 1902 further comprising a display 1908. The measurement device 1904 is capable of outputting a measurement either directly to a display 1908 or indirectly to the display 1908 through an intermediary processing unit which can then output a useful measurement. The display 1908 gives a mobile fuel station operator a means of determining and recording how much fuel was used in a refueling service. In the case of an autonomous mobile fuel station or a mobile fuel station that can automatically retrieve a fuel measurement without the need for a display, a third communication device may be used within the fuel nozzle or within the mobile fuel station which communicates to the network the amount of fuel dispensed. For a gaseous fuel nozzle, the measurement device may be a mass flow meter, a volumetric flow meter, a flow rate meter, or a pressure transducer. For an electric fuel nozzle, the measurement device may comprise an ammeter, voltmeter, electric power meter, or other device capable of measuring how much electrical fuel or energy is dispensed through the electric fuel nozzle.

The systems disclosed herein may be embodied in other specific forms without departing from their spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A mobile vehicle refueling system comprising:
a vehicle comprising a first communication device,
the first communication device wirelessly transmitting data to and receiving data from a network;
a mobile fuel station comprising a second communication device,
the second communication device wirelessly transmitting data to and receiving data from the network,
the mobile fuel station further comprising separate refueling reservoirs each storing respectively liquid, gaseous, and electric fuel for refueling third-party vehicles and dispensing the fuel from the refueling reservoirs through a single hybrid fuel line comprising electrical wires for dispensing electric fuel therethrough for refueling the third-party vehicles;
fuel nozzles each for dispensing one of liquid, gaseous, and electric fuel respectively each fuel nozzle selectively detachably connected to the single hybrid fuel line; and wherein
the first communication device transmits to the network a vehicle location and a vehicle fuel status, the second communication device receives the vehicle location and the vehicle fuel status, and the mobile fuel station travels to the vehicle location to perform a refueling service.

2. The mobile vehicle refueling system of claim 1, wherein the refueling service comprises one or more services comprising refueling liquid fuel into the vehicle, refueling gaseous fuel into the vehicle, and refueling electric fuel into the vehicle.

3. The mobile vehicle refueling system of claim 2, wherein the refueling service is at least partially carried out by one or more human operators.

4. The mobile vehicle refueling system of claim 2, wherein the refueling service is at least partially carried out by a pre-programmed autonomous system.

5. The mobile vehicle refueling system of claim 1, wherein the mobile fuel station further comprises one or more cantilevered columns, said cantilevered columns being attached to a hinge, said hinge being attached to a side of the mobile fuel station, and wherein the single hybrid fuel line comprising electric wires extends along a length of the cantilevered column.

6. The mobile vehicle refueling system of claim 1, wherein the mobile fuel station further comprises one or more replacement gaseous and electric refueling modules respectively, the vehicle comprises one or more gaseous and electric fuel modules respectively, and wherein the refueling service comprises replacement of the one or more fuel modules with a replacement refueling module.

7. The mobile vehicle refueling system of claim 6, wherein the refueling service is carried out by one or more preprogrammed robotic arms attached to the mobile refueling station.

8. The mobile vehicle refueling system of claim 6, wherein the refueling service is carried out by one or more human operators.

9. The mobile vehicle refueling system of claim 1, wherein the network further comprises a computer, said computer using vehicle location data and vehicle status data to create a vehicle travel history and a vehicle fuel consumption history, the computer also creating a predicted vehicle location.

10. The mobile vehicle refueling system of claim 9, wherein the vehicle location comprises the predicted vehicle location.

11. The mobile vehicle refueling system of claim 9, wherein the computer is also capable of storing and retrieving one or more vehicle user profiles.

12. The mobile vehicle refueling system of claim 11, wherein the vehicle user profiles comprise one or more vehicle user data sets from a list of data sets consisting of name, birth date, user picture, home address, work address, phone number, occupation, bank account, payment service account, credit card, debit card, payment schedule, refueling schedule, preferred refueling location, vehicle year, vehicle make, vehicle model, vehicle color, vehicle YIN number, license plate number, fuel type, and fuel company.

13. The mobile vehicle refueling system of claim 1, wherein the refueling service further comprises a service selection, the service selection displaying to a vehicle user one or more service options comprising a future refuel date, a fuel company, a fuel cost, a refuel location, a refuel time, a payment method, and a payment receipt method.

14. The mobile vehicle refueling system of claim 1, further comprising one or more maintenance services comprising an oil change, a transmission fluid change, a windshield washing fluid top-off, a vehicle cleaning, a windshield replacement, a rock chip repair, a headlight cleaning, a surface polishing, a tire inflation, and a wiper replacement.

15. The mobile vehicle refueling system of claim 1, wherein the vehicle status comprises one or more indicators comprising an oil change indicator, a transmission fluid change indicator, a windshield washing fluid top-off indicator, a vehicle cleaning indicator, a windshield replacement indicator, a rock chip repair indicator, a headlight cleaning indicator, a surface polishing indicator, a tire inflation indicator, a wiper replacement indicator, and a fuel level indicator.

16. The mobile vehicle refueling system of claim 15, wherein one or more of the indicators are automatically triggered by vehicle sensors.

17. The mobile vehicle refueling system of claim 15, wherein the vehicle further comprises manual controls and one or more of the indicators are capable of being triggered by a vehicle user by means of the manual controls.

18. The mobile vehicle refueling system of claim 1, wherein the first wireless communication device and the second wireless communication device use electromagnetic communication to communicate with the network.

19. The mobile vehicle refueling system of claim 1, wherein the first wireless communication device and the second wireless communication device use Sure-Fi to communicate with the network.

20. The mobile vehicle refueling system of claim 1, wherein the plurality of fuel nozzles each comprise a measurement device and a display, the measurement device measuring a quantity of fuel dispensed through the respective fuel nozzle and the display displaying the quantity of fuel dispensed.

* * * * *